United States Patent [19]

Streeter et al.

[11] 4,453,451
[45] Jun. 12, 1984

[54] HYDRAULIC STEERING SYSTEM WITH AUTOMATIC EMERGENCY PUMP FLOW CONTROL

[75] Inventors: Robert T. Streeter, Pleasant Plains; David F. Carl, Springfield, both of Ill.

[73] Assignee: FiatAllis North America, Inc., Deerfield, Ill.

[21] Appl. No.: 205,184

[22] Filed: Nov. 10, 1980

[51] Int. Cl.³ .............................................. F15B 13/04
[52] U.S. Cl. .......................................... 91/28; 91/516
[58] Field of Search ..................... 91/6, 516, 33, 518, 91/28, 532

[56] References Cited

U.S. PATENT DOCUMENTS

| | | | |
|---|---|---|---|
| 3,410,295 | 11/1968 | Malott | 91/28 |
| 3,455,210 | 7/1969 | Allen | 91/446 |
| 3,838,573 | 10/1974 | Laumond | 91/532 |
| 3,878,679 | 4/1975 | Sievenpiper | 60/422 |
| 3,911,942 | 10/1975 | Becker | 91/446 |
| 3,916,767 | 11/1975 | Barton | 91/516 |
| 3,994,133 | 11/1976 | Pfeil | 60/422 |
| 4,043,419 | 8/1977 | Larson | 60/420 |
| 4,070,858 | 1/1978 | Hand | 91/516 |
| 4,213,300 | 7/1980 | Biskis | 91/516 |

Primary Examiner—Abraham Hershkovitz
Attorney, Agent, or Firm—August E. Roehrig, Jr.

[57] ABSTRACT

A vehicle hydraulic system wherein there is provided a primary pump coupled to a steering control valve through which steering of the vehicle is effected. A main priority valve is used to meter the flow of pressurized hydraulic fluid from the primary pump to either the steering control valve or an implement valve which is utilized to effect operation of auxiliary equipment, in accordance with the priority demands of the steering system. An auxiliary ground-drive pump provides a source of pressurized hydraulic fluid at all times the vehicle is in motion and is coupled to the steering control valve to provide a source of pressurized fluid when necessary or circulates the pressurized fluid to sump. The application of the output from the ground-drive pump is controlled by a secondary priority valve coupled to the output from the ground-drive pump to direct the output to the steering control valve or to sump. The main priority valve and secondary priority valve are both coupled to a common pressure source which applies a predetermined pressure differential to each of the valves for maintaining each of the respective valves in a desired position.

4 Claims, 1 Drawing Figure

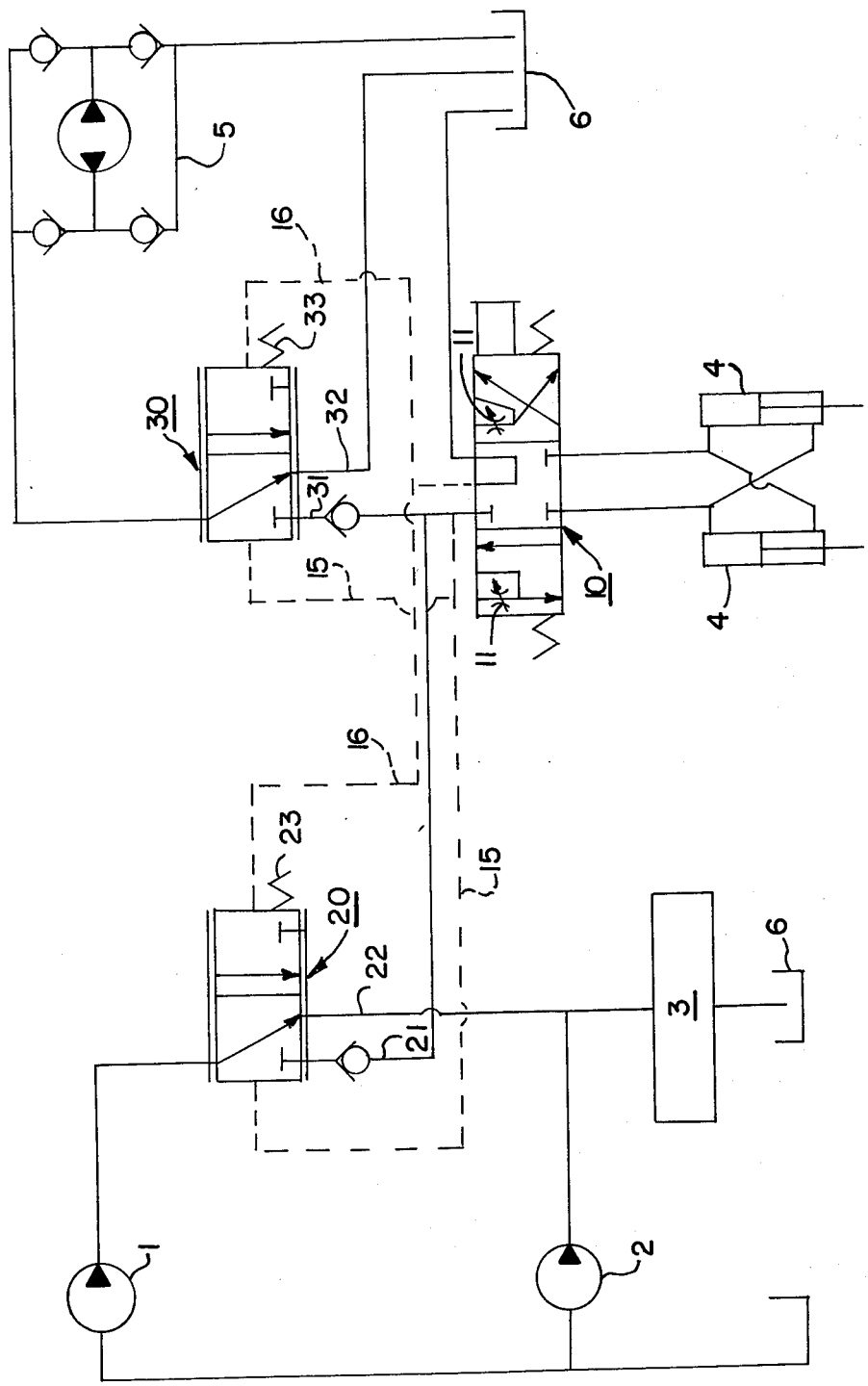

HYDRAULIC STEERING SYSTEM WITH AUTOMATIC EMERGENCY PUMP FLOW CONTROL

BACKGROUND OF THE INVENTION

This invention relates in general to vehicle hydraulic systems and, in particular, to a hydraulic system for use in a vehicle such as earthmoving or construction machinery wherein the hydraulic system is utilized for operating the vehicle and actuating various auxiliary equipment or implements.

More specifically, but without restriction to the particular use which is shown and described, this invention relates to a vehicle hydraulic system wherein a primary pump, driven by the vehicle engine or torque converter, provides a source of pressurized hydraulic fluid to a steering control valve which is utilized to effect steering of the vehicle. A ground-drive auxiliary pump, which is actuated by movement of the vehicle in either a forward or reverse direction, provides a back-up system for the primary pump to insure a source of pressurized hydraulic fluid, at all times the vehicle is in motion.

In the operation of earthmoving and construction machinery, due to the size and weight of the vehicle and the function it must perform, hydraulics are utilized to control operation of the vehicle such as steering and braking, as well as to power the various auxiliary equipment or implements used with such vehicles. Such hydraulic systems are utilized for convenience, control of operations, and the safety of the machine operator and those working in close proximity to the machine. Power steering and braking, as well as the operation of the various hydraulic powered implements, require a source a pressurized hydraulic fluid to perform these functions, which is generally provided by a pump driven by the vehicle engine or torque converter. However, if the vehicle engine or torque converter stops while the vehicle is in motion, or if the vehicle is moved without power, no pressurized hydraulic fluid would be provided through such a system. Therefore, an auxiliary hydraulic system must be provided to insure that the vehicle may be safely steered and brought to stop regardless of whether or not it is operating under its own power.

In order to eliminate a potential safety hazard which might result if the primary hydraulic fluid pumping system is disabled or is not operating, an auxiliary or emergency hydraulic pumping system is incorporated in such vehicles. While such a system may be electrically driven, such as being powered by the vehicle batteries, a ground-drive auxiliary pump is frequently utilized. Such ground-drive pumps are powered by the physical movement of the vehicle in either a forward or reverse direction, and thereby provide a source of pressurized hydraulic fluid at all times when the vehicle is in motion. Since these pumps are in continuous operation while the vehicle is moving, the pump recirculates the hydraulic fluid into a sump or reservoir until such time as needed for operation. In the event that the flow of hydraulic fluid from the primary pump system is not sufficient, then the ground-drive pump is automatically available for powering the vehicle's hydraulic systems.

During normal operation, when the ground-drive pump is recirculating hydraulic fluid through the sump, it is desirable that any hydraulic fluid output from the primary pump which is not required by the vehicle steering system, be available for use by the auxiliary system to power the vehicle implements. While the auxiliary system generally has an implement pump to provide a source of pressurized hydraulic fluid for the auxiliary equipment or vehicle implements, the combining of the unused output from the steering pump with the implement pump output makes for better and more efficient operation. However, the steering pump's primary function is to provide a source of pressurized hydraulic fluid for the steering system. Therefore, a priority valve is used to couple the primary steering pump to the auxiliary system to maintain an adequate supply of hydraulic fluid in the steering system at all times, with the excess pressurized hydraulic fluid being available for use by the auxiliary implement system. The priority valve meters the output of pressurized hydraulic fluid from the primary steering pump to the steering control valve to maintain an adequate supply of hydraulic fluid for use in the steering system of the vehicle. The pressurized hydraulic fluid not needed to maintain this supply to the steering system is available for use with the auxiliary or implement equipment of the vehicle.

While such metering priority valve systems, and emergency steering systems, have been used in separate hydraulic systems, the present invention couples two priority valve controlled systems in a manner to permit different actuating pressure differentials, used to control the application of a ground-drive pump system to a vehicle steering system and the diversion of primary pump hydraulic fluid fluid flow from the steering system to an auxiliary or implement system, to be simultaneously controlled from a single pressure differential establishing source.

SUMMARY OF THE INVENTION

It is, therefore, an object of this invention to improve vehicle hydraulic systems.

Another object of this invention is to make more efficient use of the pressurized hydraulic fluid utilized in the vehicle hydraulic system.

A further object of this invention is to insure an adequate source of hydraulic fluid pressure is available to effect certain vehicle operations at all times.

These and other objects are attained in accordance with the present invention wherein there is provided a primary pump coupled to a steering control valve through which steering of the vehicle is effected. A main priority valve is used to meter the flow of pressurized hydraulic fluid from the primary pump to either the steering control valve or an implement valve which is utilized to effect operation of auxiliary equipment, in accordance with the priority demands of the steering system. An auxiliary ground-drive pump provides a source of pressurized hydraulic fluid at all times the vehicle is in motion and is coupled to the steering control valve to provide a source of pressurized fluid for steering when necessary, or circulates the pressurized fluid to sump. The application of the output from the ground-drive pump is controlled by a secondary priority valve coupled to the output from the ground-drive pump to direct the output to the steering control valve or to sump. The main priority valve and secondary priority valve are both coupled to common pilot and signal pressure lines such that the actuation of both priority valves is controlled in response to the differential pressure between these two pressure lines. During normal operation the primary pump will meet the flow requirements of the steering control valve, and the ground-drive pump will recirculate hydraulic fluid to sump. Once a first predetermined pressure differential exists across the steering valve, excess flow of pressurized hydraulic fluid is available through the primary priority valve to the implement valve for use by the auxiliary equipment. Upon the need for pressurized fluid from the ground-drive pump, which would occur when this first pressure differential desired to be maintained across the primary priority valve decreases below a second level, a secondary priority valve would be actuated to couple a sufficient flow of pressurized hydraulic fluid from the ground-drive pump to the steering control valve to re-establish a sufficient flow of fluid to the steering control valve.

DESCRIPTION OF THE DRAWING

Further objects of the invention, together with additional features contributing thereto and advantages accruing therefrom, will be apparent from the following description of a preferred embodiment of the invention which is shown in the accompanying drawing which illustrates a hydraulic schematic of the system.

DESCRIPTION OF A PREFERRED EMBODIMENT

Referring now to the drawing, there is shown a portion of a vehicle hydraulic system including a primary pump 1 and an implement pump 2, both of which are driven by a vehicle engine or torque converter (not shown) to provide a source of pressurized hydraulic fluid. The output of the implement pump 2 is coupled through an implement valve 3 to provide a source of pressurized fluid for use in controlling the operation of various auxilliary implements associated with the vehicle, such as the lifting arms or bucket of a front end loader. The pump 1 is used primarily to provide a source of pressurized hydraulic fluid to a pair of steering cylinders 4 for steering the vehicle, and has its output coupled to a closed-center pressure-compensated steering control valve 10 through a main priority or compensator valve 20.

A bi-rotational ground-drive pump 5 is also coupled to the steering control valve 10 to provide a source of pressurized hydraulic fluid to the vehicle steering system at all times that the vehicle is in motion. The output from the ground-drive pump 5 is coupled to an emergency steering priority valve or secondary compensator valve 30 which directs the output from the ground-drive pump to the steering control valve 10, through line 31, or to a sump 6, through line 32, in response to the hydraulic pressure differential established across the steering control valve 10.

Both the main priority valve or main compensator valve 20, and the emergency steering priority valve or secondary compensator valve 30, are metering valves. Each of these valves has a compensator spring 23 and 33, respectively, having a pre-load such that upon a predetermined differential pressure being applied to the respective valves ($\Delta P_1$, and $\Delta P_2$, ), respectively, the valves will be maintained in a steady state or equilibrium position. As the actual pressure differentials applied to the valves change, these valves can adjust accordingly to increase or decrease the flow of hydraulic fluid therethrough, in response thereto, until a pressure differential has again been established to balance against the pre-load of their respective compensator springs.

The output from the main priority valve 20 is metered between one extreme position whereat substantially the entire output is directed to the steering control valve 10, through line 21, to another extreme position whereat substantially all of the output from the primary pump is directed to the implement valve 3, through line 22. In this latter position, illustrated in the drawing, a hydraulic fluid pressure differential is applied to the steering control valve 10 sufficient to maintain the predetermined pressure drop $\Delta P_1$ across the main compensator valve 20 in order to hold the valve in this position. Between these two extreme positions, the main priority valve or main compensator valve 20 meters the output of hydraulic fluid from the primary pump 1 to the steering control valve 10 in order to maintain the predetermined pressure differential, $\Delta P_1$. Therefore, an adequate supply of hydraulic pressure is available to the steering control valve 10 at all times when the primary pump 1 is in normal operation. The excess hydraulic fluid not needed to establish this pressure differential $\Delta P_1$ is passed through line 22 to the implement valve 3.

The pilot pressure line 15 is coupled to the steering control valve 10 from one side of the main compensator valve 20, and a load sense line 16 is coupled to the other side of the main priority valve 20. These lines are in fluid communication with the steering control valve 10 to apply the predetermined pressure differential $\Delta P_1$, to the main priority valve 20 to balance against the force of the pre-load established by the valve compensator spring 23. In this manner the main priority valve 20 provides sufficient hydraulic fluid output to the steering control valve 10 so long as the pressure differential $\Delta P_1$, exists, regardless of the quantity of hydraulic fluid required by the steering system.

When the need for pressurized hydraulic fluid through the steering control valve 10 increases or decreases, the quantity of hydraulic fluid available to the implement valve 3 conversely will decrease or increase, correspondingly. As long as this predetermined pressure differential $\Delta P_1$ is applied to the main priority valve 20, it will be held in a steady-state condition, subject to the priority demand of the steering control valve 10. Such a suitable priority or compensator valve is known to those skilled in the art, and is sometimes referred to as a priority flow divider which may be of a type such as disclosed in U.S. Pat. Nos. 3,455,210; 3,878,679; 3,911,942 and 4,043,419.

The emergency steering priority valve, or secondary compensator valve 30, is preferably of the same construction as the main priority valve or main compensator 20, except that the compensator spring 33 has a lower pre-load. Therefore, the pressure differential $\Delta P_1$ coupled to the secondary compensator valve 30, exceeds the pressure differential $\Delta P_2$ required to balance the pre-load of compensator spring 33. In normal operation, when the vehicle engine is operating, the greater pressure differential $\Delta P_1$ required to maintain the main priority valve 20 in an equilibrium position, will exceed $\Delta P_2$ thereby overcoming the pre-load of compensator spring 33 and holding valve 30 in the position shown in the drawing.

Since the ground-drive pump 5 is effective to provide a source of pressurized hydraulic fluid whenever the vehicle is moving in either a forward or a reverse direction, the output from the ground-drive pump 5 is applied to the emergency steering priority valve 30 whenever the vehicle is in motion. In this position, the flow through the emergency steering priority valve 30 is such that substantially all of the flow will be directed through line 32 to the sump 6. In the event the pressure differential between lines 15 and 16 decreases below $\Delta P_2$, the pressure differential required to maintain equilibrium with compensator spring 33, the emergency steering priority valve 30 will meter hydraulic fluid to the steering control valve 10, through line 31.

The steering control valve 10, as shown, is a three-position valve. When the steering control valve is in the center or neutral position, the pressure in pilot line 15 is the same as the inlet pressure to steering valve 10, and the load sense line 16 is coupled through the steering control valve 10 to the "0" pressure in the sump 6. Therefore, in the neutral position, where no hydraulic fluid is passing through the steering control valve 10, the pressure differential across the main priority valve 20 is at least equal to a pressure to establish $\Delta P_1$. The main priority valve or main compensator valve 20 wll thereby be maintained in an equilibrium position with the valve shifted to allow a maximum flow of hydraulic fluid therethrough to the implement valve 3 as shown in the drawing.

When the steering control valve 10 is shifted by the vehicle operator to effect a steering function, either to the right or left of the position shown in the drawing, the movement of the steering control valve will determine the quantity of pressurized hydraulic fluid which will pass therethrough to effect movement of the steering cylinders 4. A pair of metering orifices 11 are provided in the steering control valve 10 so that regardless of the volume of hydraulic fluid passing through the steering valve, the variable orifices 11 will establish the desired pressure drop $\Delta P_1$ across orifice 11, and applied through pilot line 15 and load sense line 16 to both of the priority valves 20 and 30. Movement of the steering control valve 10 to the right or left of the position shown in the drawing will couple the pilot control line 15 to the upstream side of one of the metering orifices 11, and the load sense line 16 will be on the downstream side of the same orifice and also coupled back to the spring end of both the main and secondary compensator valves 10 and 30, respectively. Therefore, during normal operation the pressure differential $\Delta P_1$ will be applied to these valves at all times regardless of the quantity of pressurzied fluid passing through the steering control valve 10.

When the primary pump 1 is operating, the pressure differential between lines 15 and 16, established across the metering orifices 11 of the steering control valve 10, is sufficient to balance the main compensator valve 20 against the pre-load of its compensator spring 23. Therefore, whatever quantity of fluid flow which is not needed by the steering system is available to the implement valve 3. This pressure differential $\Delta P_1$, as previously explained, is greater than the pressure differential $\Delta P_2$ necessary to balance the emergency steering priority or secondary compensator valve 30 against the pre-load of its compensator spring 33. Therefore, the secondary compensator valve 30 will be held in the position illustrated, so that the pressurized fluid from the ground-drive pump 5 is recirculated to the sump 6. If this pressure differential between pilot pressure line 15 and load sense line 16 decreases sufficiently, e.g.: vehicle engine failure, the net force created by the pressure differential will become insufficient to overcome the pre-load of compensator spring 33 (less than $\Delta P_2$) and the valve 30 will shift to apply the output from the ground-drive pump 5 to the steering control valve 10.

Upon such an occurrence the emergency steering valve 30 will maintain a pressure differential $\Delta P_2$ across orifice 11.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hydraulic system wherein multiple sources of hydraulic fluid can be selectively diverted to perform system functions according to a predetermined priority comprising primary pump means for creating a first source of pressurized hydraulic fluid for coupling to a hydraulic fluid actuated system component actuable upon receipt thereof for performing a first priority function, secondary pump means for creating a second source of pressurized hydraulic fluid for coupling to a hydraulic fluid actuated system component actuable upon receipt thereof for performing said first priority function, tertiary pump means for creating a third source of pressurized hydraulic fluid for coupling to a second hydraulic fluid actuated system component actuable upon receipt thereof for performing a second priority function, a first priority hydraulic fluid actuated system component coupled for fluid communication with said first and second source of pressurized hydraulic fluid from said primary and said secondary pump means, respectively, a second priority hydraulic fluid actuated system component coupled for fluid communication with said first and third source of pressurized hydraulic fluid from said primary and said tertiary pump means, respectively, control means in fluid communication with said first priority hydraulic fluid actuated system component for establishing a pressure differential through said first priority hydraulic fluid actuated system component in response to the passage of hydraulic fluid to said first priority hydraulic fluid actuated system component, primary compensator valve means coupled between said primary pump means and said first and said second priority hydraulic fluid actuated system components for selectively coupling said first source of pressurized hydraulic fluid to said first or said second priority hydraulic fluid actuated system components in response to said pressure differential established through said first priority hydraulic fluid actuated system component, secondary compensator valve means coupled between said secondary pump means and said first priority hydraulic fluid actuated system component for selectively coupling said second source of pressurized hydraulic fluid to said first priority hydraulic fluid actuating system component in response to a predetermined decrease in the pressure differential established through said first priority hydraulic fluid actuated system component, and said control means in fluid communication with said first priority hydraulic fluid actuated system component for establishing a pressure differential through said first priority hydraulic fluid actuated system component in response to the passage of hydraulic fluid thereto being in further fluid communication with said secondary compensator valve means for establishing a pressure differential through said second compensator valve means to control the coupling of said second source of pressurized hydraulic fluid to said first priority hydrualic fluid actuated component.

2. The hydraulic system of claim 1 wherein said secondary pump means for creating a second source of pressurized hydraulic fluid is coupled through said secondary compensator valve means to sump means in response to the establishment of a predetermined pressure differential through said secondary compensator valve means in response to the pressure differential established through said control means in fluid communication with said first priority hydraulic fluid actuated system component.

3. The hydraulic system of claim 1 wherein said control means in fluid communication with said first priority hydraulic fluid actuated system component for establishing a pressure differential thereacross in response to the passage of hydraulic fluid thereto, is coupled in fluid communication with said primary and secondary compensator valve means to apply the same magnitude of pressure differential thereacross for effecting the coupling of said respective first and second sources of pressurized hydraulic fluid to said first priority hydraulic fluid actuated system component.

4. The hydraulic system of claim 1 wherein said control means in fluid communication with said first priority hydraulic fluid actuated system component for establishing a pressure differential thereacross in response to the passage of hydraulic fluid thereto, is coupled in fluid communication with said primary compensator valve means to apply said pressure differential thereto for selectively diverting said first source of pressurized hydraulic fluid from said first priority hydraulic fluid actuated system component to said second priority hydraulic fluid actuated system component.

* * * * *